Figure 2:
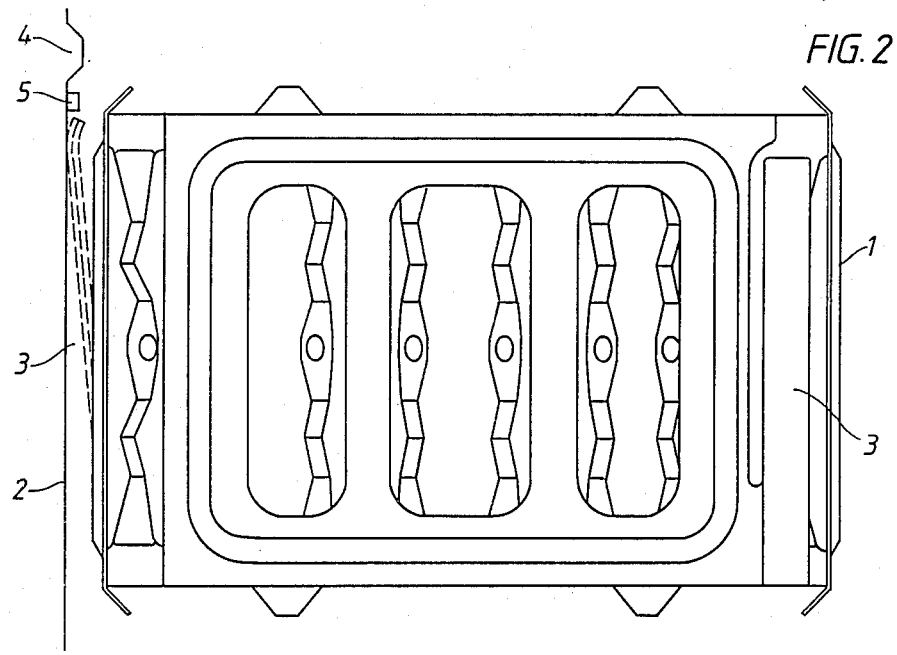

United States Patent [19]

Nylund

[11] Patent Number: 4,859,407

[45] Date of Patent: Aug. 22, 1989

[54] NUCLEAR REACTOR FUEL ASSEMBLY

[75] Inventor: Olov Nylund, Västeras, Sweden

[73] Assignee: AB Asea-Atom, Västeras, Sweden

[21] Appl. No.: 151,903

[22] Filed: Feb. 3, 1988

[30] Foreign Application Priority Data

Feb. 6, 1987 [SE] Sweden .................................. 8700462

[51] Int. Cl.[4] .............................................. G21C 3/32
[52] U.S. Cl. ..................................... 376/446; 376/438; 376/445
[58] Field of Search ................. 376/438, 442, 445, 446

[56] References Cited

U.S. PATENT DOCUMENTS

| | | | |
|---|---|---|---|
| 3,405,033 | 10/1968 | Widell et al. | 376/438 |
| 4,077,843 | 3/1978 | Patterson | 376/446 |
| 4,295,935 | 10/1981 | Anthony | 376/285 |
| 4,489,038 | 12/1984 | Nylund | 376/446 |
| 4,740,350 | 4/1988 | Taleyarkhan | 376/441 |

Primary Examiner—Donald P. Walsh
Attorney, Agent, or Firm—Watson, Cole, Grindle & Watson

[57] ABSTRACT

The invention relates to a fuel assembly for a nuclear reactor comprising a bundle of longitudinal fuel rods which are insertable into the fuel assembly and held together by spacers (1), consisting of cells, arranged along the bundle. The wall of the fuel assembly towards the bundle of fuel rods is provided with a number of first locking members (5) arranged in the longitudial direction of the wall, and the spacers (1) are provided with a second locking member. The second locking member comprises at least two interconnected rods (3), one rod consisting of material having a low coefficient of thermal expansion and the other rod consisting of material having a high coefficient of thermal expansion. These rods have been adapted, in dependence on the temperature in the reactor in operation, to bring the second locking member into engagement with the first locking members (5) and to release the same when the reactor is shutdown.

3 Claims, 6 Drawing Sheets

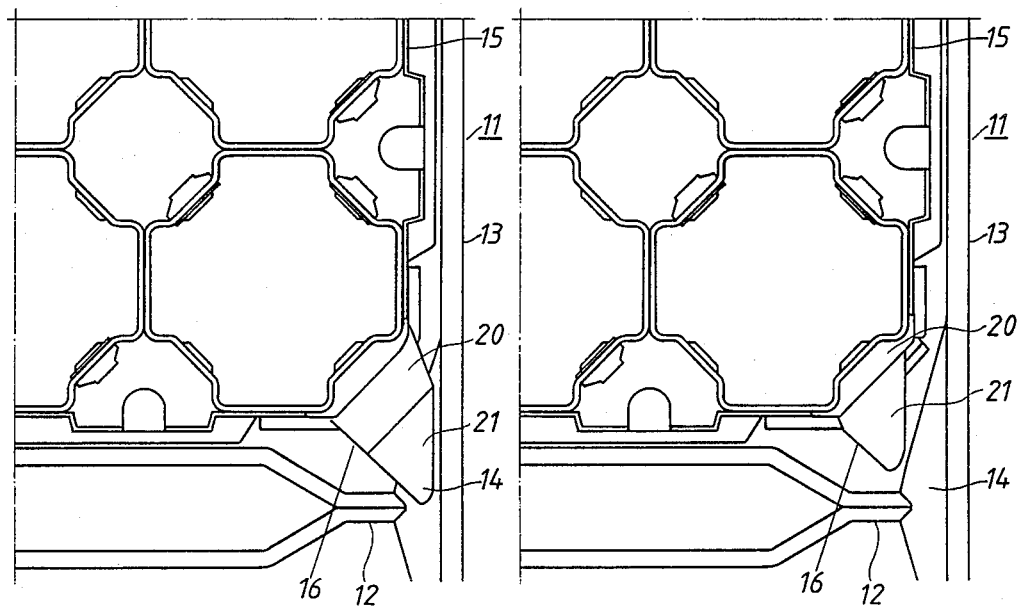
FIG. 8  FIG. 10
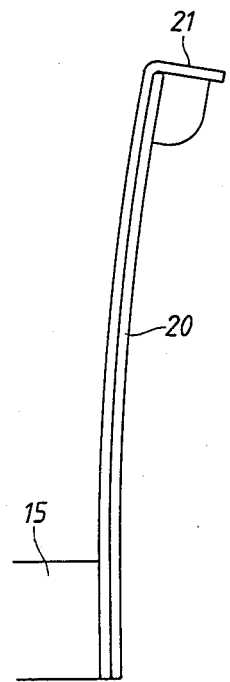 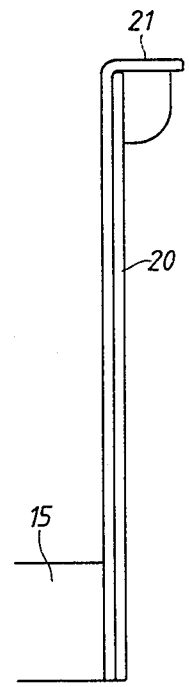
FIG. 9  FIG. 11

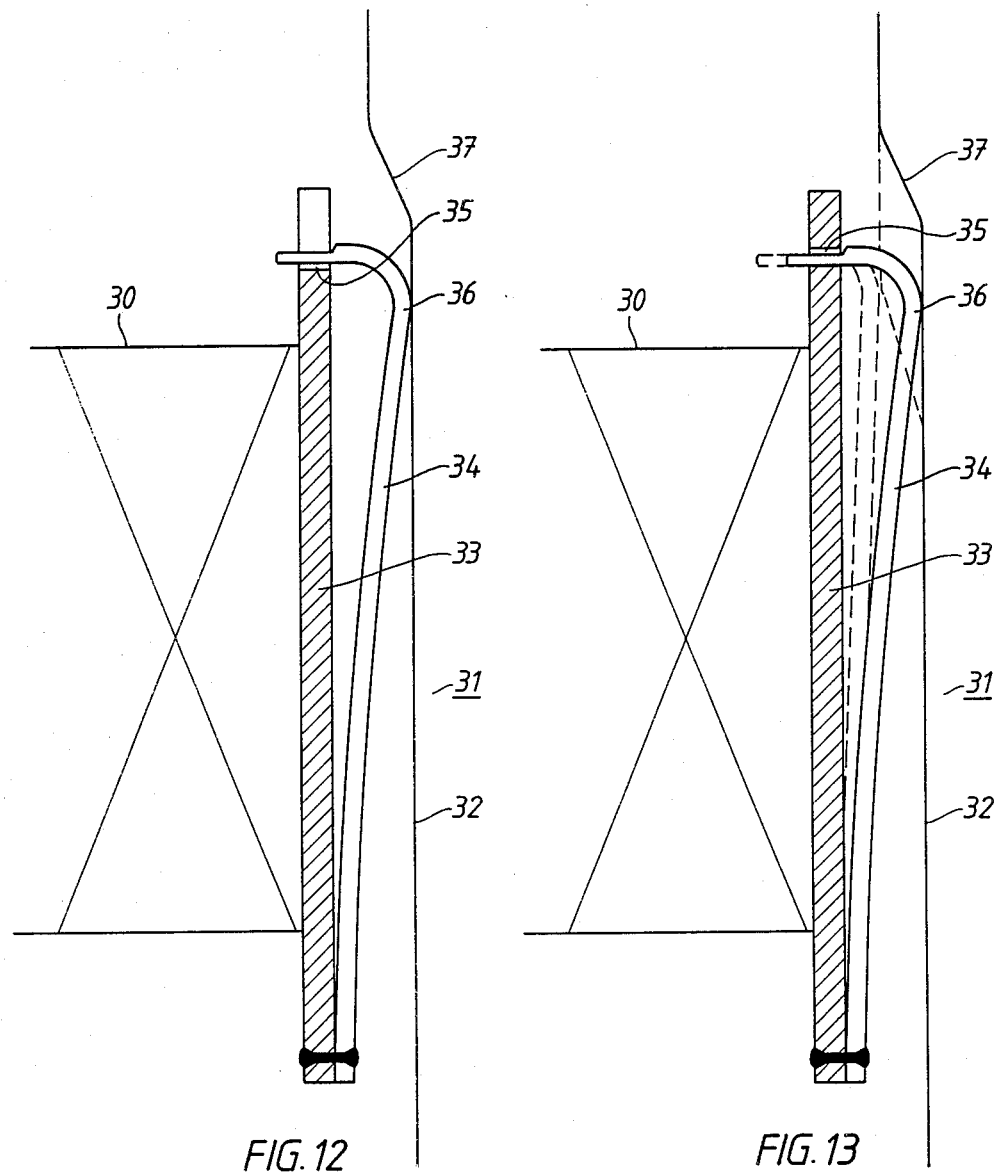

NUCLEAR REACTOR FUEL ASSEMBLY

A nuclear reactor fuel assembly normally consists of a tubular container having a length of several metres, often of rectangular or square cross-section. It contains a large number of similarly long, tubular fuel rods arranged in parallel in a certain definite, normally symmetrical pattern. The fuel rods are held fixed in this pattern by means of a number of so-called spacers, for example of the type disclosed in Swedish Patent No. 312 612. The spacers are arranged at even intervals along the bundle of fuel rods and are kept in position along the vertically arranged bundle by a certain inherent resilience against the individual fuel rods. However, because of the neutron irradiation, the spring force in the spacer springs diminishes, and after a few years it is only a fraction of the original. It may then occur that the spacers, by the influence of the flow along the bundle, are displaced upwards and that considerable portions of the bundle remain completely unsupported. To avoid this and to fix the spacers in the vertical direction, numerous methods have been used, such as special spacer holder rods, spacing sleeves, and also special locking members between the walls of the fuel assembly and the spacers. In the latter case, the wall of the fuel assembly has been provided with a number of first locking members, arranged in the longitudinal direction of the wall, and each spacer with a second locking member adapted to engage the first locking members when inserting a fuel rod, serving as a key, into the fuel rod bundle.

A drawback of the latter, known embodiment has been that, in order to withdraw a fuel rod bundle from the fuel assembly container, it has been necessary to release the above-mentioned locking members from one another by first pulling out the fuel rod, serving as a key, from the bundle.

According to the invention, the above-mentioned drawback is overcome by constructing the second locking member from at least two interconnected rods, one of which consisting of a material with a low coefficient of linear expansion and the other of a material with a high such coefficient. These rods are adapted, in dependence on the temperature in the reactor during reactor operation, to bring the second locking member into engagement with the first locking members and to release the same in the case of a shutdown reactor. This means that the locking between the fuel rod bundle and the fuel assembly container is automatically interrupted when the reactor is stopped and the temperature in the reactor drops below a certain value. Conversely, the spacers for the fuel rod bundle are locked to the container wall when the reactor is taken into operation and the temperature in the reactor has increased to such a value that the temperature-dependent locking members are influenced.

The invention will be most readily understood with reference to the accompanying FIGS. 1–15, showing different embodiments of the invention.

Figure 1:
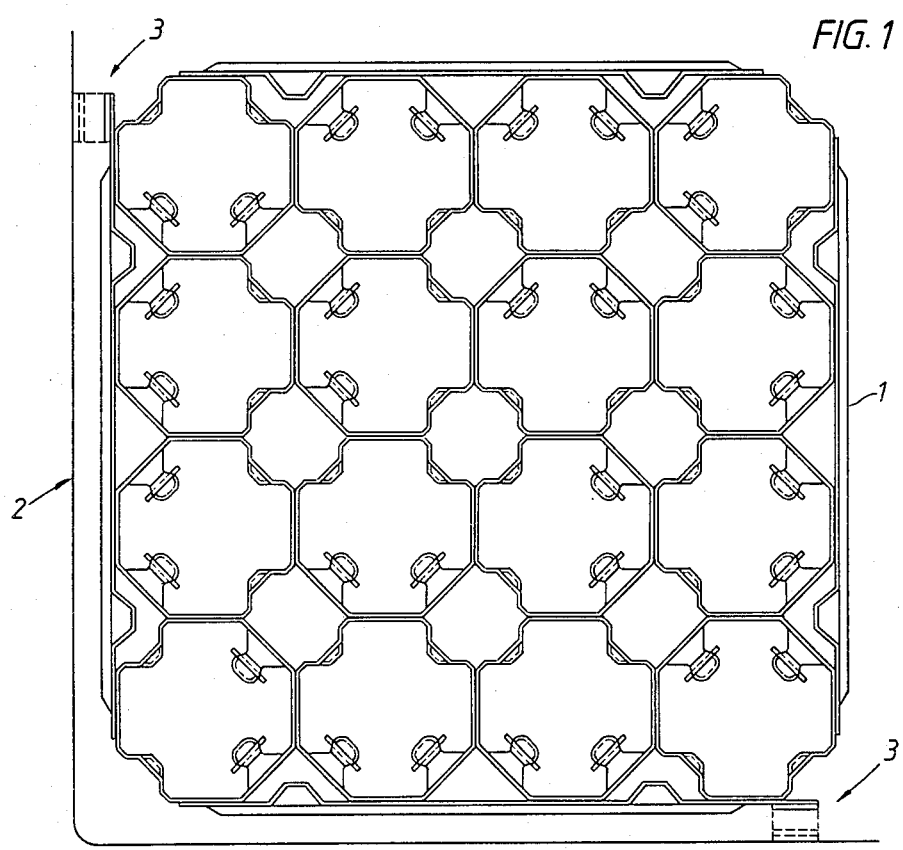
Figure 3:
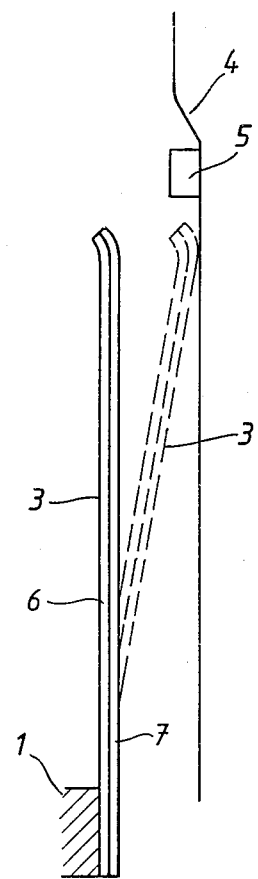

In FIG. 1, 1 designates a spacer seen from above and 2 designates the wall of the surrounding fuel assembly. Bimetallic springs 3 are fixed to the outside of the spacer 1, at the bottom thereof, at diagonally opposite corners. In FIG. 2 the same spacer 1 is shown viewed from the side, the wall 2 of the fuel assembly being indicated on the lefthand side. The wall 2 is provided with an indentation 4 and possibly with a welded-on projection 5 to bring about a more reliable locking. The indentation 4 and the projection 5 form the so-called first locking member. The bimetallic spring 3, which forms the second locking member, is indicated in dashed line in its interlocking position in both FIGS. 1 and 2. In this position the bimetallic spring 3, as also sketchily indicated in FIG. 3, contacts the indentation 4 or the projection 5 if the spacer 1 starts moving upwards in the fuel assembly. At a low temperature the bimetallic spring 3 returns to its initial position, thus terminating the interlock between the spacer 1 and the fuel assembly wall 2. In the shown bimetallic spring 3, the blade 6 consists of stainless steel with a high coefficient of linear expansion, whereas the blade 7 may consist of, for example, Inconel or Invar with a low coefficient of linear expansion.

Figures 4, 6:
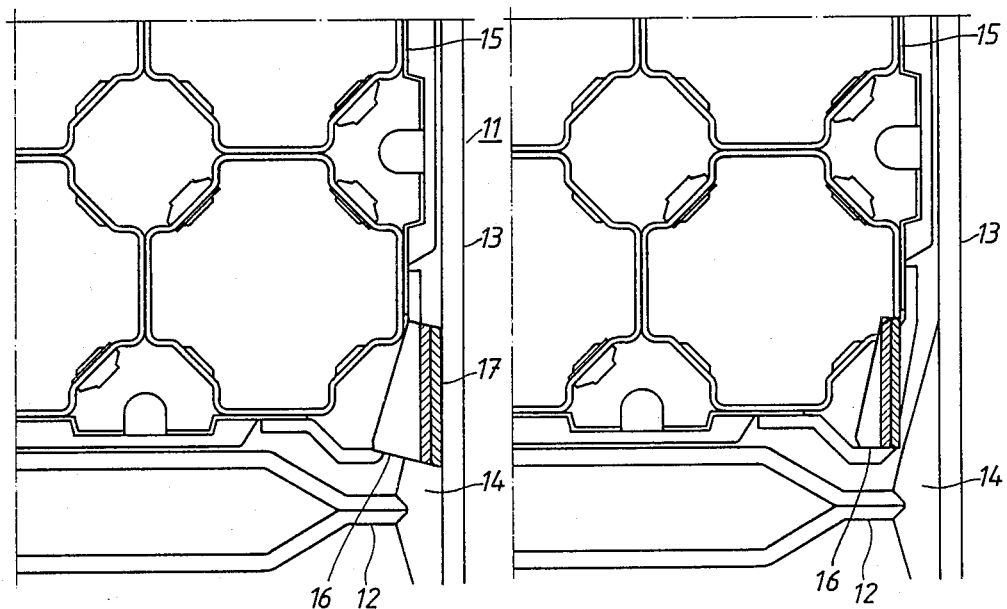
Figures 5, 7:
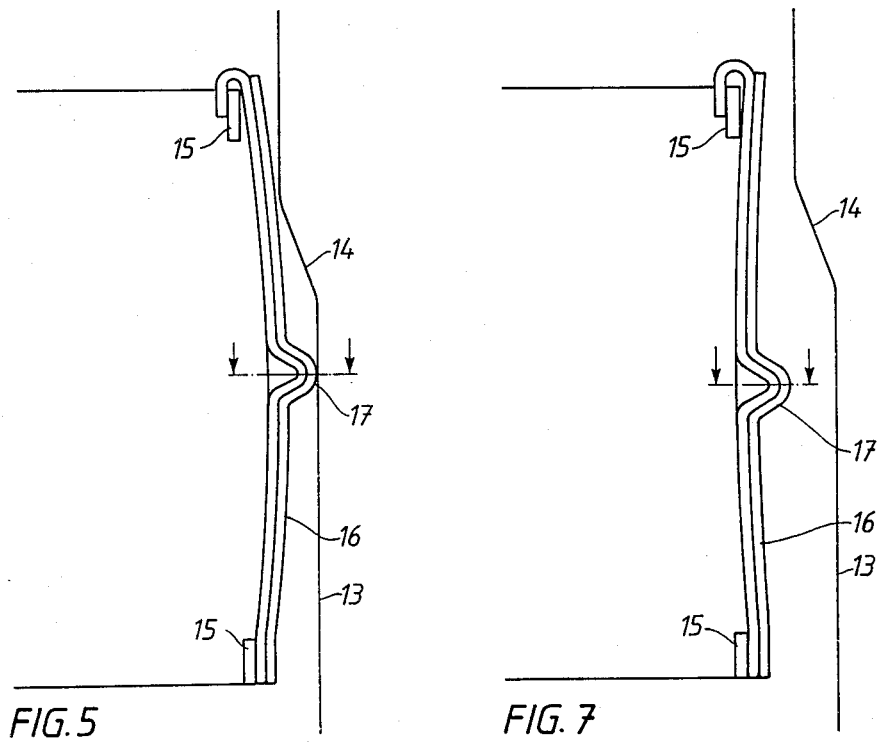

FIGS. 4–7 show a different embodiment of the invention, wherein FIGS. 4 and 5 show a spacer in locked position and FIGS. 6 and 7 a spacer in unlocked position. FIG. 4 shows a corner of a fuel assembly 11 seen from above, the fuel assembly 11 being divided into four equally large channels by partitions 12 in the form of a cross. At the joint between the partition 12 and the outer wall 13 of the fuel assembly 11, a number of shoulders 14 are formed where the partition 12 and the outer wall 13 are welded together. Part of a spacer 15 is shown in the channel. On the outside of the spacer 15—in one of its corners—a locking member in the form of a bimetallic spring 16 is arranged.

FIG. 5 shows the bimetallic spring 16 quite schematically and seen from the side. At its bottom the spring 16 is fixed to the lower part of the spacer 15 and at its upper part the spring 16 is bent over the spacer 15 and thus movably joined to the spacer 15 at that point. In the central part of the bimetallic spring 16 there is a projection 17, which corresponds to the previously mentioned second locking member, whereas the shoulder 14 forms the corresponding first locking member.

Accordingly, FIGS. 4 and 5 show the interlock at a high temperature and in a locked position, whereas FIGS. 6 and 7 with the corresponding designations show the same interlock at a low temperature and in an unlocked position.

FIGS. 8–11 show a minor variation of the locking device according to FIGS. 4–7. The only difference is the shape and attachment of the bimetallic spring. In FIGS. 8–11 the same designations as in FIGS. 4–7 are used, with the exception of the bimetallic spring, which is here designated 20, and the hook 21 provided at the top of the spring. As will be seen, in this embodiment the bimetallic spring 20 is fixed only at the lower part of the spacer 15, and the device operates largely in the same way as that shown in FIG. 3. In locking position, the hook 21 engages between the shoulders 14.

Consequently, FIGS. 8 and 9 show the interlock at a high temperature and in a locked position, whereas FIGS. 10 and 11 show the same interlock at a low temperature and in an unlocked position.

FIGS. 12 and 13 show a somewhat different embodiment of the invention. The device is schematically shown from the side.

In FIG. 12, 30 designates the spacer, and the wall of the fuel assembly 31 is designated 32. A rod 33 is fixed to the spacer 30, consisting of a material with a low coefficient of linear expansion, for example Zircaloy. A spring 34, shaped as a swan neck, is fixed by one end to the lower end of the rod 33. The other end of this spring 34 extends through a hole 35 in the rod 33. The bend 36 of the spring 34 runs constantly against the wall 32. In this case, the spring 34 is made of a material with a high coefficient of linear expansion, for example stainless steel. Further, the spring 34 is slender and will easily move resiliently to the side when not locked. 37 designates a shoulder in the wall 32. FIG. 12 shows the device at a high temperature, whereby the end of the spring 34 is locked in the hole 35, which means that it will no longer move resiliently away from the shoulders 37 in the wall 32. Thus, an interlock has been attained between the spacer and the fuel assembly.

FIG. 13 shows the same device in a cold unlocked state, in which the end of the spring 34 is able to move freely back and forth in the hole 35.

In the embodiment according to FIGS. 12 and 13, it is, of course, possible to change the character of the rod 33 so that it consists of a material with a high coefficient of linear expansion, if only the spring 34 is changed correspondingly.

Figure 14:
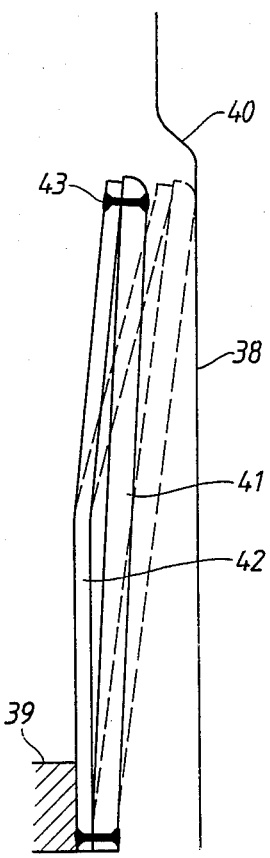
Figure 15:
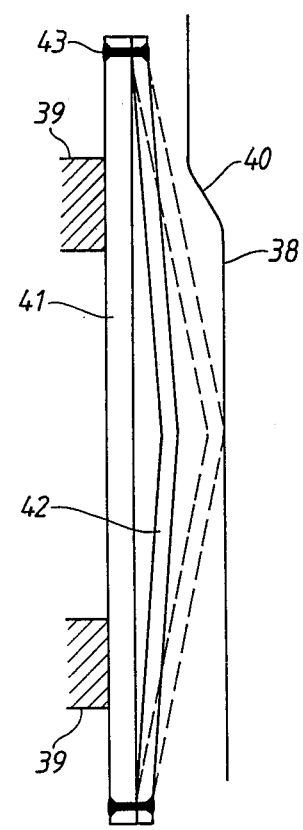

FIGS. 14 and 15 show an additional locking device, composed of a straight rod 41 of Zircaloy and a bent bin 42 of stainless steel. The rod 41 and the pin 42 are joined together by rivets 43 at their ends, which is due to the fact that Zircaloy and stainless steel are difficult to weld together. The wall of the fuel assembly is designated 38 and is provided with an indentation 40. At the bottom the locking device is fixed to the spacer 39. As will be clear from FIGS. 14 and 15, the bent stainless steel pin 42 has a greater coefficient of linear expansion than the Zircaloy rod 41. The operation of the locking device will be readily understood without further explanation of the figures, the dash-lined position representing the reactor in operation, and consequently, the device in locked position.

Finally, it must be pointed out that the material textures in the locking device must be chosen so as to avoid problems with different longitudinal growth of the material in the locking device in dependence on the irradiation.

I claim:

1. A fuel assembly for a nuclear reactor having a bundle of longitudinal fuel rods insertable into the fuel assembly, said fuel rods being held together by spacers (1), consisting of cells, arranged along the bundle, the wall (2) of the fuel assembly towards the fuel rod bundle being provided with a number of first locking members arranged in the longitudinal direction of the wall and the spacers (1) being provided with a second locking member, characterized in that said second locking member comprises at least two interconnected rods, one rod consisting of material having a low coefficient of linear expansion and the other rod consisting of material having a high coefficient of linear expansion, said rods being adapted, in dependence on the temperature in the reactor in operation, to bring said second locking member into engagement with said first locking members and to release the same when the reactor is shutdown.

2. Fuel assembly according to claim 1, characterized in that said second locking member comprises a locking projection (5) mounted on a bimetallic spring (3) and intended to engage said first locking members.

3. Fuel assembly according to claim 1, characterized in that said second locking member comprises a locking tongue consisting of a rod (33) of a material having a certain coefficient of thermal expansion, a swan-neck shaped spring (34), which by one end is joined to one end of the rod (33), consisting of a material having a coefficient of thermal expansion different from that of the rod (33), the other transversely arranged end of said spring (34) extending through a transverse hole (35) in the other end of the rod (33), said spring (34) having a part (36) bent out from the rod (33) which is in permanent engagement with said first locking member, said transversely arranged end of said spring (34) being adapted to be locked in said hole (35) at a high surrounding temperature.

* * * * *